United States Patent
Peterson et al.

(10) Patent No.: US 9,635,045 B2
(45) Date of Patent: Apr. 25, 2017

(54) DETECTING UNAUTHORIZED, RISKY, OR INEFFICIENT USAGE OF PRIVILEGED CREDENTIALS THROUGH ANALYSIS OF REMOTE SHELL PROTOCOL BANDWIDTH

(71) Applicant: Dell Software, Inc., Round Rock, TX (US)

(72) Inventors: Matthew T. Peterson, Lindon, UT (US); Daniel F. Peterson, Pleasant Grove, UT (US); Jordan S. Jones, Spanish Fork, UT (US)

(73) Assignee: Dell Software, Inc., Round Rock, TX (US)

( * ) Notice: Subject to any disclaimer, the term of this patent is extended or adjusted under 35 U.S.C. 154(b) by 39 days.

(21) Appl. No.: 14/694,634

(22) Filed: Apr. 23, 2015

(65) Prior Publication Data

US 2016/0315959 A1    Oct. 27, 2016

(51) Int. Cl.
    *G06F 12/14*    (2006.01)
    *G06F 15/16*    (2006.01)
    *G06F 15/173*    (2006.01)
    *H04L 29/06*    (2006.01)
    *H04L 29/08*    (2006.01)

(52) U.S. Cl.
    CPC ........ *H04L 63/1425* (2013.01); *H04L 67/143* (2013.01)

(58) Field of Classification Search
    CPC .......................... H04L 63/1425; H04L 67/143
    USPC .................... 726/22; 709/217, 224, 229, 232
    See application file for complete search history.

(56) References Cited

U.S. PATENT DOCUMENTS

2009/0193115 A1* 7/2009 Sugita .................. G06F 15/173
                                                        709/224
2016/0323288 A1* 11/2016 Peterson ............... H04L 63/102

\* cited by examiner

*Primary Examiner* — Aravind Moorthy
(74) *Attorney, Agent, or Firm* — Brian Tucker; Kirton McConkie

(57) ABSTRACT

A privileged account management system can maintain a database that defines a normal amount of data that should be transferred over a remote session and/or a normal rate at which the data should be transferred when performing a particular task. Using a reason code used to obtain a remote session and possibly a combination of various different characteristics of the remote session, the system can access the database to identify the appropriate normal amount and/or normal rate. The system can then compare the amount and/or rate of data transferred over the remote session to the appropriate normal amount and/or normal rate to detect when an abnormal amount and/or abnormal rate is being transferred. In cases where abnormal behavior is detected, the system can determine that the remote session is likely being used in an improper manner, and can take action to mitigate any potential harm to the server.

20 Claims, 11 Drawing Sheets

| Reason Code 401 | Protocol 402 | Server 403 | Admin 404 | Incoming Amount 405 | Outgoing Amount 406 | Incoming Rate 407 | Outgoing Rate 408 |
|---|---|---|---|---|---|---|---|
| Reboot Server | SSH | Server A | Admin A | 95 KB | 50 KB | 4 KB/s | 3 KB/s |
| Reboot Server | SSH | Server B | Admin A | 80 KB | 50 KB | 4 KB/s | 3 KB/s |
| Reboot Server | RDP | Server A | Admin A | 365 KB | 3041 KB | 10 KB/s | 25 KB/s |
| Reboot Server | RDP | Server B | Admin B | 405 KB | 2955 KB | 11 KB/s | 24 KB/s |
| Reboot Server | RDP | Server A | Admin A | 395 KB | 3051 KB | 10 KB/s | 25 KB/s |
| Update BIOS | SSH | Server A | Admin B | 64 MB | 96 KB | 30 MB/s | 30 KB/s |
| Update BIOS | SSH | Server A | Admin C | 65 MB | 110 KB | 30 MB/s | 30 KB/s |
| Update BIOS | SSH | Server A | Admin A | 64 MB | 99 KB | 30 MB/s | 30 KB/s |
| Update BIOS | RDP | Server B | Admin A | 69 MB | 4105 KB | 30 MB/s | 25 KB/s |
| Update BIOS | RDP | Server A | Admin A | 45 MB | 3513 KB | 25 MB/s | 24 KB/s |
| Update BIOS | RDP | Server A | Admin C | 70 MB | 3900 KB | 30 MB/s | 25 KB/s |
| Update BIOS | RDP | Server B | Admin C | 48 MB | 2900 KB | 25 MB/s | 24 KB/s |

Monitor Each Of A Plurality Of Remote Sessions To Identify One Or More Of An Amount Of Data That Is Transferred Over The Remote Session Or A Rate That Data Is Transferred Over The Remote Session, Each Remote Session Being Associated With A Reason Code That Defines A Task To Be Accomplished Over The Remote Session, Each Remote Session Being Established Using A Particular Protocol

702

From Each Of A Plurality Of Sets Of Remote Sessions, Generate One Or More Of A Normal Amount Or A Normal Rate From The One Or More Of The Identified Amounts Or Rates From The Set Of Remote Sessions, Wherein Each Of The Remote Sessions In The Set Is Associated With The Same Reason Code And Was Established Using The Same Protocol

703

For Each Set Of Remote Sessions, Store, In The Database, A Reason Code Entry In Association With The Reason Code, The Protocol, And The One Or More Of The Normal Amount Or Normal Rate For The Set Such That Each Reason Code Entry In The Database Defines One Or More Of A Normal Amount Or A Normal Rate Of Data That Is Transferred When Performing The Task Associated With The Reason Code Over A Remote Session Established Using The Associated Protocol

*FIG. 7*

DETECTING UNAUTHORIZED, RISKY, OR INEFFICIENT USAGE OF PRIVILEGED CREDENTIALS THROUGH ANALYSIS OF REMOTE SHELL PROTOCOL BANDWIDTH

CROSS-REFERENCE TO RELATED APPLICATIONS

N/A

BACKGROUND

Most organizations maintain at least one server for storing sensitive information and executing secure resources. For example, an organization may maintain a customer database that stores sensitive information about its customers on a server. Typically, access to such servers is restricted by locating the servers in a secure area and by requiring admin credentials to obtain access to the servers. In this specification, access to a server should be construed broadly as encompassing access to any data stored on the server, access to any application executing on the server (including the operating system of the server), or access to any other computing construct provided by the server.

In such cases, an organization will typically employ one or more administrators to maintain the servers. To allow these administrators to perform their assigned functions, they may oftentimes share the admin credentials for accessing the secure servers so that any one of the administrators can use the admin credentials at any particular time. FIG. 1 depicts this typical scenario. As shown, an administrator 150 uses a client device 102 to access a server 101 using admin credentials known to administrator 150 and possibly to other administrators. Access in this manner is typically accomplished by using a network protocol (e.g., SSH, RDP, Telnet, etc.) to remotely connect to server 101.

Various problems exist with this approach including, for example, that an administrator may retain knowledge of the admin credentials even after his employment with the organization, and that there are few options for identifying which administrator has used the admin credentials to perform a particular task on server 101. To address these problems, an organization may oftentimes employ a privileged account (or access) management ("PAM") system. Generally, a PAM system acts as an intermediary between server 101 and client device 102 to manage and/or monitor access to server 101.

PAM systems can typically perform two basic functions. First, a PAM system can control and monitor who obtains access to the admin credentials. This is typically accomplished by frequently changing the admin credentials (e.g., after each use of the admin credentials). FIG. 2A depicts an example of a PAM system providing this function. Second, a PAM system can monitor the interactions of the administrator with the server while using a remote session to connect to the server. FIGS. 2B and 2C depict different examples of a PAM system providing this function.

In FIG. 2A, a PAM system 103 acts as an intermediary between client device 102 and server 101 to control and monitor who obtains access to the admin credentials for creating a session with server 101. In this scenario, it will be assumed that PAM system 103 updates the admin credentials (e.g., changes the password) after each time an administrator is given access to the admin credentials (e.g., after each time an administrator checks in the admin credentials). Accordingly, prior to accessing server 101, an administrator is required to request the current admin credentials. As shown, in step 1, administrator 150 uses client device 102 to send a request to PAM system 103 for the current admin credentials for accessing server 101. Typically, this request will first require authentication (e.g., the input of credentials specific to administrator 150) and specify a reason for the request (e.g., to reboot server 101, backup server 101, install or update a server resource, etc.). In such cases, a security officer 151 will be notified of the request. In step 2, the security officer approves the request causing the current admin credentials to be returned to (or checked out to) client device 102 in step 3. Then, in step 4, administrator 150 can use the checked out admin credentials to create a session (e.g., an SSH or RDP session) with server 101 to accomplish the desired tasks. Finally, in step 5, after completing the desired tasks, administrator 150 checks in the admin credentials. Typically, PAM system 103 would then change the admin credentials to prevent administrator 150 from being able to again access server 101 without first repeating steps 1-3.

FIGS. 2B and 2C represent different ways in which PAM system 103 may be configured to allow a session to be monitored. In some implementations, this monitoring can be performed in conjunction with the functions described with reference to FIG. 2A. FIG. 2B represents a case where PAM system 103 employs a proxy between client device 102 and server 101. In contrast, FIG. 2C represents a case where PAM system 103 employs an agent on server system 101 to manage a session with client device 102. Although not specifically described, PAM system 103 could also employ a hosted session configuration which, for purposes of this background, would be illustrated in a similar manner as FIG. 2B but with the proxy being replaced by a hosted session component. It is noted that the specific configuration employed by PAM system 103 is not essential to the invention, and the invention applies equally to any configuration of PAM 103.

In the proxy configuration depicted in FIG. 2B, administrator 150, in step 1, uses client device 102 to send a request to PAM system 103 for a remote session with server 101. Typically, this request would require authentication, include a reason for the access, and require approval by security officer 151 in step 2. Assuming the request is approved, in step 3, PAM system 103 implements a proxy 201 for maintaining two remote sessions. Step 3a represents the creation of a session (e.g., an SSH or RDP session) between proxy 201 and server 101 in which the admin credentials are used by proxy 201 to access server 101. Step 3b represents the creation of a corresponding session (e.g., an SSH or RDP session) between client device 102 and proxy 201. Proxy 201 acts as an intermediary for routing session traffic between the corresponding sessions. Because all communications between client device 102 and server 101 pass through proxy 201, PAM system 103 can monitor the session as shown in step 4. In this depicted implementation, the admin credentials are never provided to administrator 150.

It is noted that a variation on the implementation shown in FIG. 2B exists in which the admin credentials are provided to administrator 150 (e.g., as described with reference to FIG. 2A). In such a variation, rather than having PAM system 103 automatically initiate the corresponding sessions via proxy 201, administrator 150 may first initiate a session with proxy 201 using the admin credentials, and then proxy 201 would initiate a corresponding session with server 101. Similarly, when the administrator is provided with the admin credentials, a PAM system may be configured to implement a transparent proxy or other type of proxy. However, as mentioned above, the present invention can be implemented in any PAM system configuration including many different types of proxy configurations.

In the agent configuration depicted in FIG. 2C, a similar set of steps are followed. The primary difference between the proxy and host configurations is that in the host configuration, the host has direct access to the server resources because it executes on server 101, and therefore a single session is required between client device 102 and agent 202. In other words, agent 202 can access server resources in a similar manner as a user could if directly interacting with server 101. In the agent configuration, for purposes of this specification, the agent that executes on the server is considered as being part of the PAM system. As with the proxy implementation, the session between client device 102 and agent 202 can be initiated automatically by PAM system 103 (e.g., in implementations where the admin credentials are not provided to administrator 150), or the session can be initiated in response to a request from client device 102 (e.g., in implementations where the admin credentials are provided to administrator 150).

In each of the configurations represented by FIGS. 2B and 2C, PAM system 103 can be configured to monitor and store any communications that are transmitted over a session between client device 102 and server 101. This monitoring can typically include capturing keystrokes and mouse input among other things.

BRIEF SUMMARY

The present invention extends to methods, systems, and computer program products for detecting unauthorized, risky, or inefficient usage of privileged credentials through analysis of remote shell protocol bandwidth. When an administrator requests access to admin credentials for establishing a remote session with a server, the administrator can provide a reason code which defines a task that the administrator intends to accomplish. A PAM system can maintain a database that defines, for each reason code, a normal amount of data that is transferred and/or a normal rate at which data is transferred when accomplishing the task associated with the reason code using a particular protocol. The PAM system can then monitor the administrator's remote session to determine whether the amount and/or rate of data transferred over the remote session is consistent with the normal amount and/or rate associated with the specified reason code and protocol used to establish the remote session. If the amount and/or rate of data transferred over the remote session exceeds the normal amount and/or rate, the PAM system can take appropriate action to mitigate any potential harm to the server.

The normal amount and/or normal rate that is associated with a reason code and protocol can be generated by monitoring, over a period of time, a number of remote sessions established with the protocol and used to accomplish the corresponding task. The amount and/or rate of data transferred over these remote sessions can then be analyzed to generate the normal amount and/or rate for the particular reason code and protocol. In some embodiments, the normal amount of data can be separated into a normal amount of incoming data (i.e., data that is transferred from the client device to the server) and a normal amount of outgoing data (i.e., data that is transferred from the server to the client device) while the normal rate can be separated into a normal rate of incoming data and a normal rate of outgoing data.

In some embodiments, a normal amount and/or normal rate may be generated that is specific to one or more of a particular server with which the remote session is established, a particular administrator, a particular peer group, or some other grouping of administrators.

In one embodiment, the present invention is implemented as a method, performed by a privileged account management system, for detecting unauthorized, risky, or inefficient usage of admin credentials. A database is maintained that defines a plurality of reason code entries. Each reason code entry is associated with one of a plurality of reason codes, a protocol, and one or more of a normal amount of data that is transferred over a remote session or a normal rate at which data is transferred over a remote session when accomplishing a task identified by the associated reason code. A request to access a first server via a first remote session using a first protocol is received from a client device. The request includes a first reason code that identifies a first task that a first administrator intends to accomplish by accessing the first server over the first remote session. The database is accessed to identify a first reason code entry that is associated with the first reason code and the first protocol, and to obtain one or more of a first normal amount or a first normal rate associated with the first reason code entry. The first remote session is monitored to identify one or more of an amount of data that is transferred over the first remote session or a rate that data is transferred over the first remote session. The one or more of the amount or rate is compared to the corresponding one or more of the first normal amount or first normal rate. When at least one of the one or more of the amount or rate exceeds the corresponding one or more of the first normal amount or first normal rate by a defined threshold, an action is taken to mitigate harm to the server.

In another embodiment, the present invention is implemented as a method, performed by a privileged account management system, for creating a database that defines a plurality of reason code entries where each reason code entry is associated with one of a plurality of reason codes, a protocol, and one or more of a normal amount of data that is transferred over a remote session or a normal rate at which data is transferred over a remote session when accomplishing a task identified by the associated reason code. Each of a plurality of remote sessions is monitored to identify one or more of an amount of data that is transferred over the remote session or a rate that data is transferred over the remote session. Each remote session is associated with a reason code that defines a task to be accomplished over the remote session. Each remote session is established using a particular protocol. From each of a plurality of sets of remote sessions, the PAM system generates one or more of a normal amount or a normal rate from the one or more of the identified amounts or rates from the set of remote sessions. Each of the remote sessions in the set is associated with the same reason code and was established using the same protocol. For each set of remote sessions, the PAM system stores, in the database, a reason code entry in association with the reason code, the protocol, and the one or more of the normal amount or normal rate for the set such that each reason code entry in the database defines one or more of a normal amount or a normal rate of data that is transferred when performing the task associated with the reason code over a remote session established using the associated protocol.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 illustrates an example data structure that can be maintained by a PAM system to define a number of reason code entries for providing normal amounts and normal rates of data for particular remote session configurations;

FIG. 7 illustrates a flowchart of an example method for creating a database that defines a number of reason code entries.

DETAILED DESCRIPTION

In this specification, a reason code should be construed as any type of information which specifies a reason for which an administrator is requesting privileged access to a server. Examples of reason codes include: reboot the server, back up the server, apply an operating system update, deploy an application, etc. A PAM system can be configured to allow any reason code to be created and used by an administrator to request access to a server. In this specification, it will be assumed that, prior to obtaining access to a server via a remote session, an administrator is required to provide a reason code that identifies the task that the administrator would like to accomplish over the remote session. A security officer, upon reviewing the administrator's reason code, may grant or deny the requested access (e.g., by allowing the administrator to check out admin credentials which the administrator can use to establish a remote session with the server or by creating a remote session for the administrator using the admin credentials).

Figure 1:
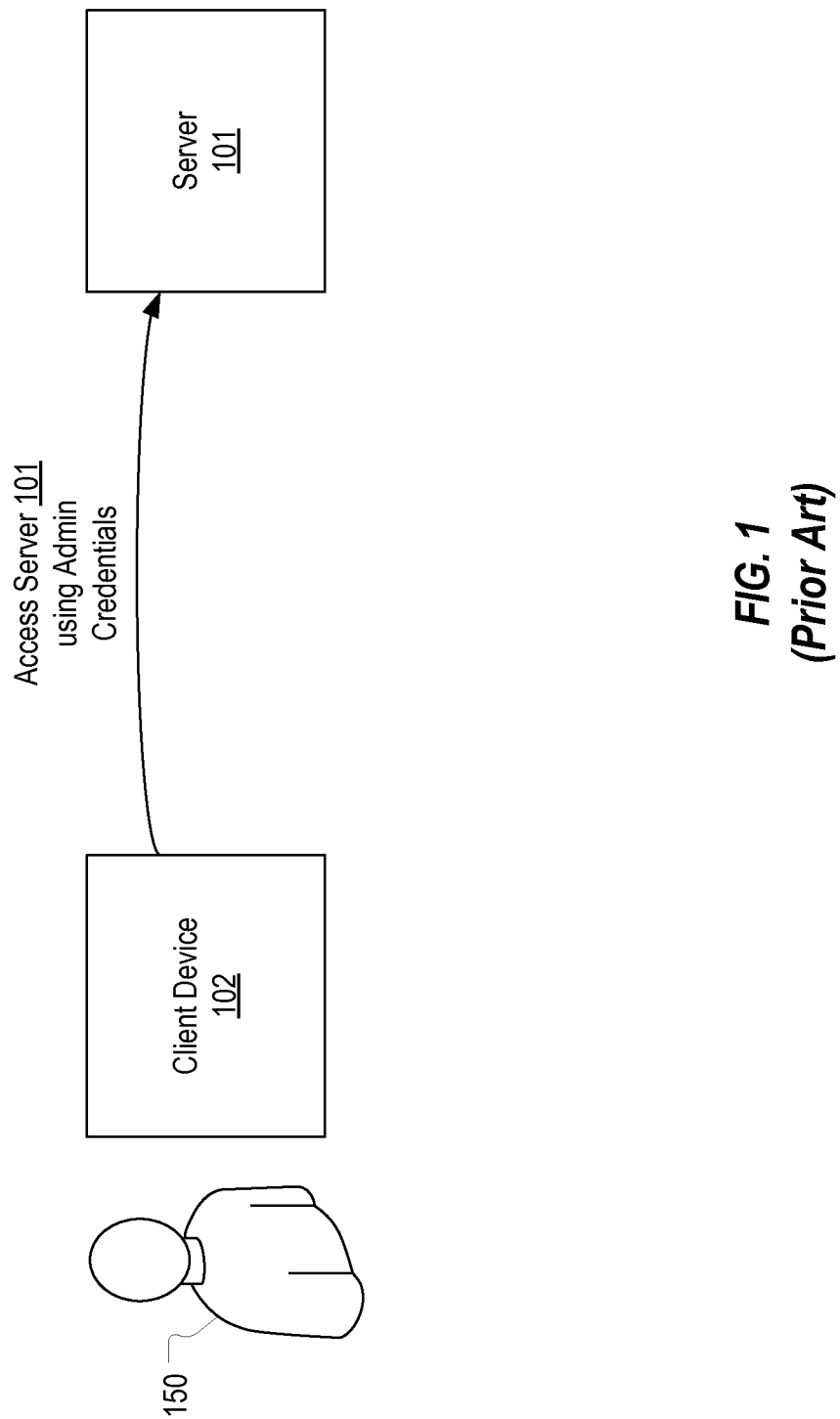
FIG. 1 illustrates a prior art example of how a client device can be used to remotely access a server using admin credentials without involvement of a PAM system.
Figure 2A:
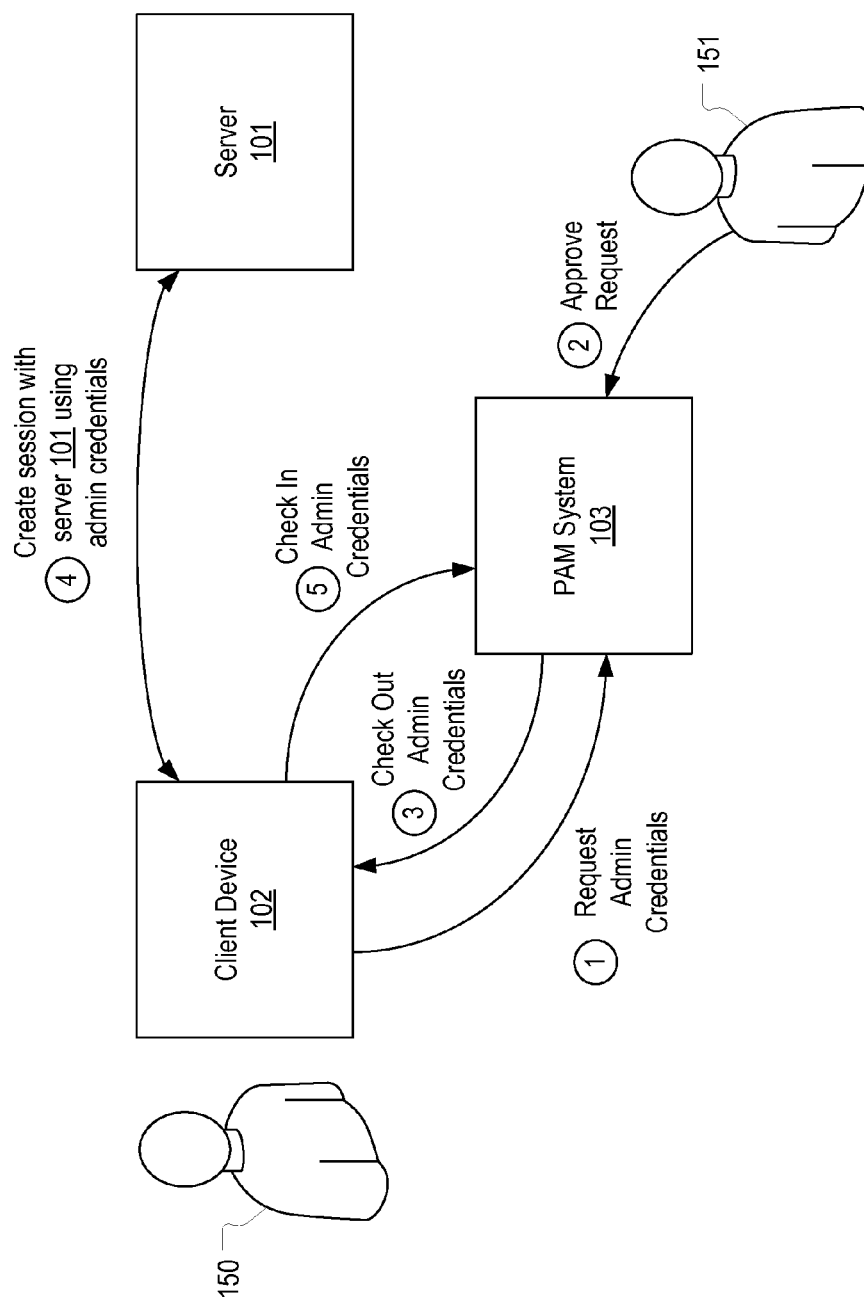
FIG. 2A illustrates a prior art example of how a PAM system can be used to control and monitor who obtains access to admin credentials used to access a server.
Figure 2B:
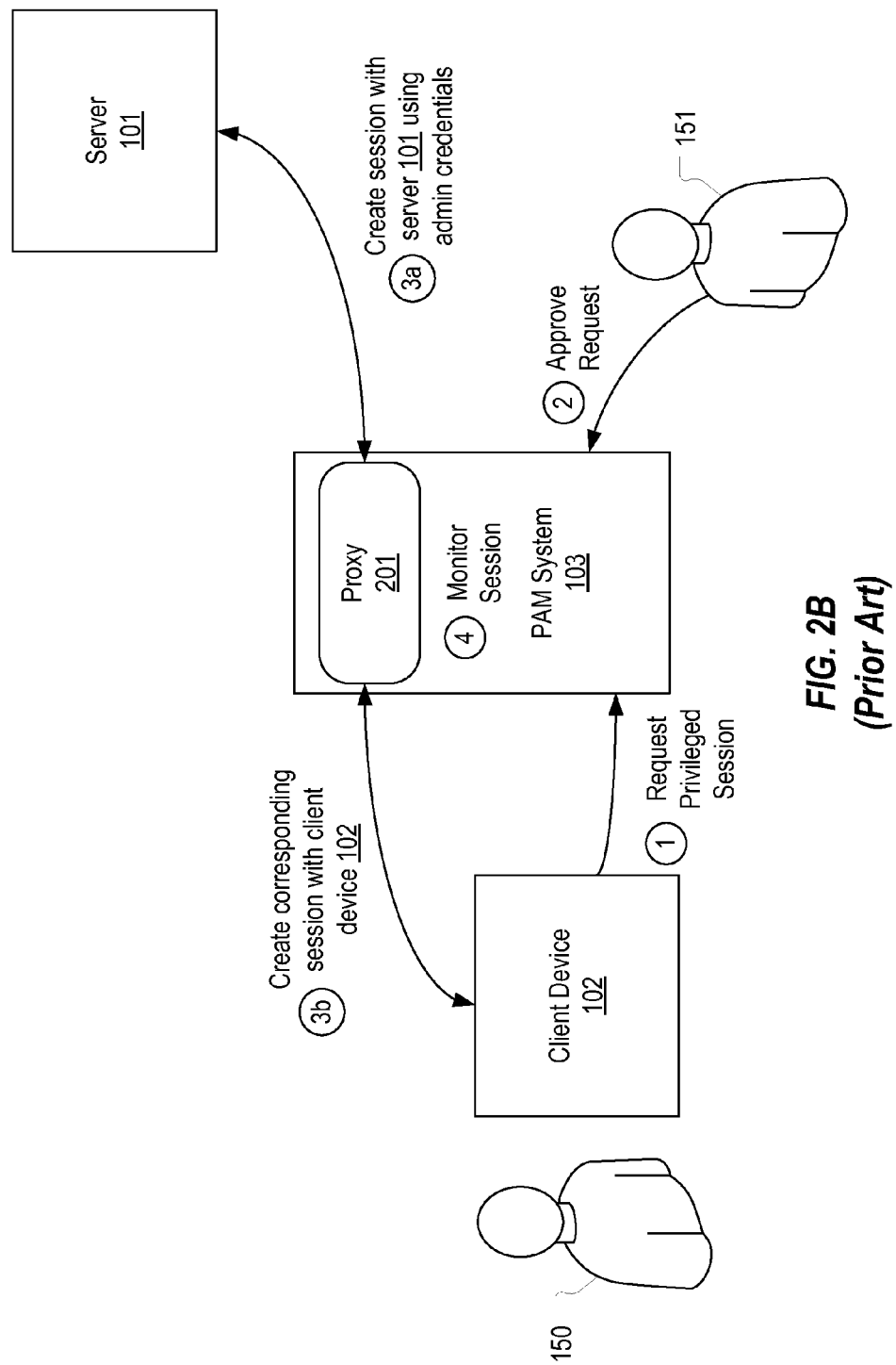
FIG. 2B illustrates a prior art example of how a PAM system can employ a proxy to control and monitor a client device's access to a server.
Figure 2C:
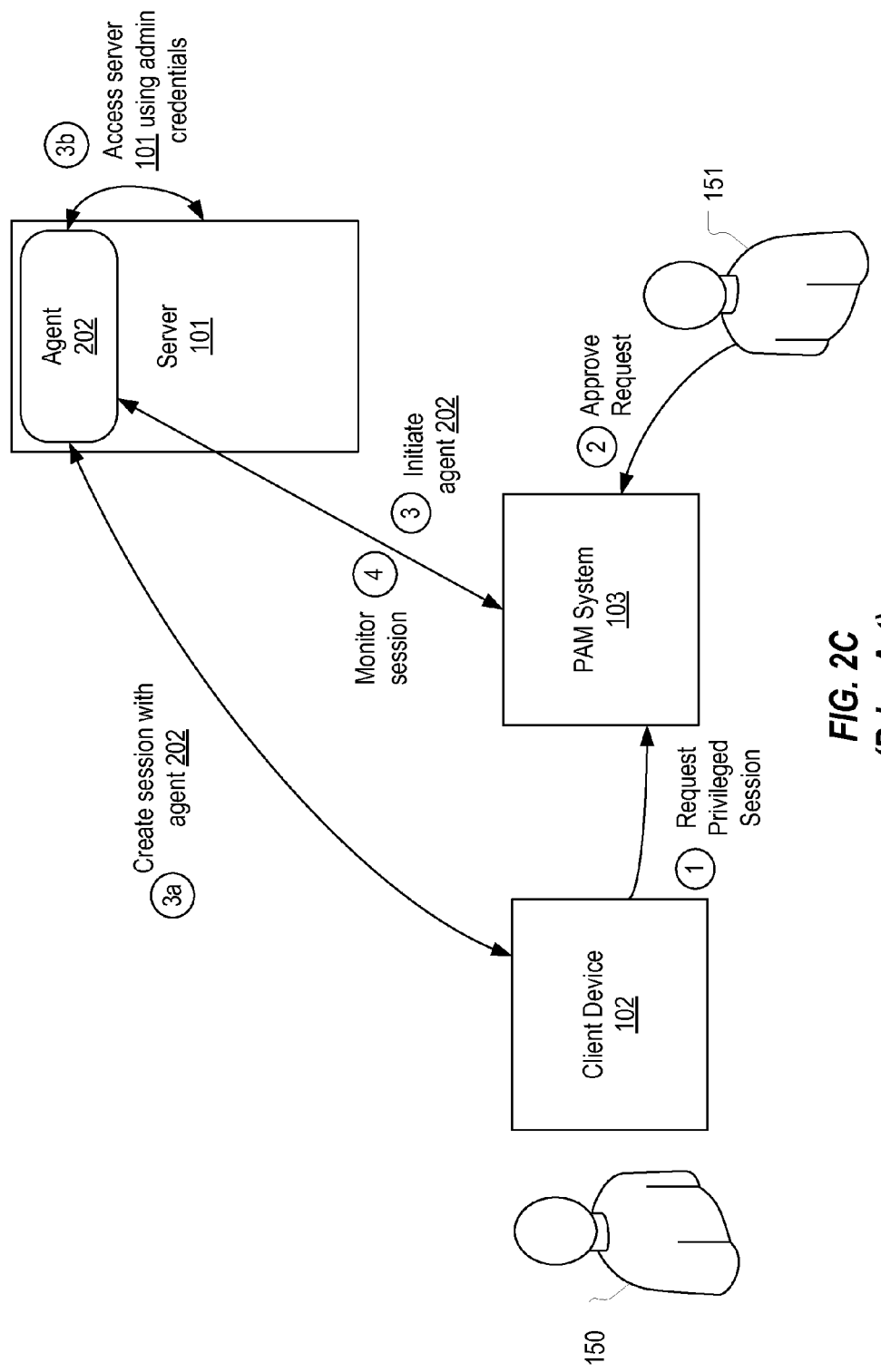
FIG. 2C illustrates a prior art example of how a PAM system can employ an agent hosted on a server to control and monitor a client device's access to the server.

A remote session should be construed as any connection between a server and a client device when a remote shell protocol is employed to establish the connection. Examples of suitable remote shell protocols include, for example, SSH, RDP, Telnet, FTP, ICA, VNC, X11, etc. Many suitable ways exist for monitoring the amount of data that is transmitted over a remote session. The present invention can be implemented using any of these different ways. The particular way in which the amount of data is monitored is not essential to the invention and will vary based on the architecture of the PAM system and the remote shell protocol employed to establish the remote session. By way of example and not limitation, the present invention can be implemented in any of the architectures depicted in FIGS. 2A-2C.

As stated above, the present invention is directed to detecting unauthorized, risky, or inefficient usage of privileged credentials through analysis of remote shell protocol bandwidth (i.e., through analysis of the amount of data transferred over a remote session and/or the rate at which such data is transferred). Unauthorized use of privileged credentials may occur when someone other than an authorized administrator uses an administrator's credentials to access a PAM system (e.g., to obtain admin credentials for creating a remote session with a server) or when someone otherwise obtains unauthorized access to the admin credentials and uses the admin credentials to establish a remote session. In such cases, because the user is not an authorized administrator, the user is unlikely to be familiar with the task associated with a particular reason code. As a result, the user is likely to use more bandwidth during a remote session associated with a particular reason code than an actual administrator would use to accomplish the task associated with the reason code. For example, an actual administrator would typically be familiar with the exact steps required to accomplish the task, whereas an unauthorized user would typically perform actions beyond those associated with the task (e.g., navigating folders/directories to identify data worth stealing or systems worth disrupting). By monitoring the amount of data transferred over a remote session, the present invention facilitates the detection of instances where an unauthorized user may be accessing a remote server.

Risky or inefficient use of privileged credentials may occur when a legitimate administrator is attempting to perform a task in an improper or atypical manner. For example, a new administrator may be attempting to perform the proper task, but may be employing an improper procedure that involves browsing the server's file system or database thereby generating much more data transfer than would typically occur when the task is performed properly. The present invention can facilitate detection of such cases to allow a security officer to take appropriate action (e.g., teaching the administrator the proper procedure). Another example of risky or inefficient use may occur when an administrator specifies an incorrect reason code (whether out of laziness, lack of knowledge, or because a proper reason code does not exist). In such cases, the actual task that the administrator performs over the remote session may require substantially more data than the task associated with the specified reason code.

Figure 3A:
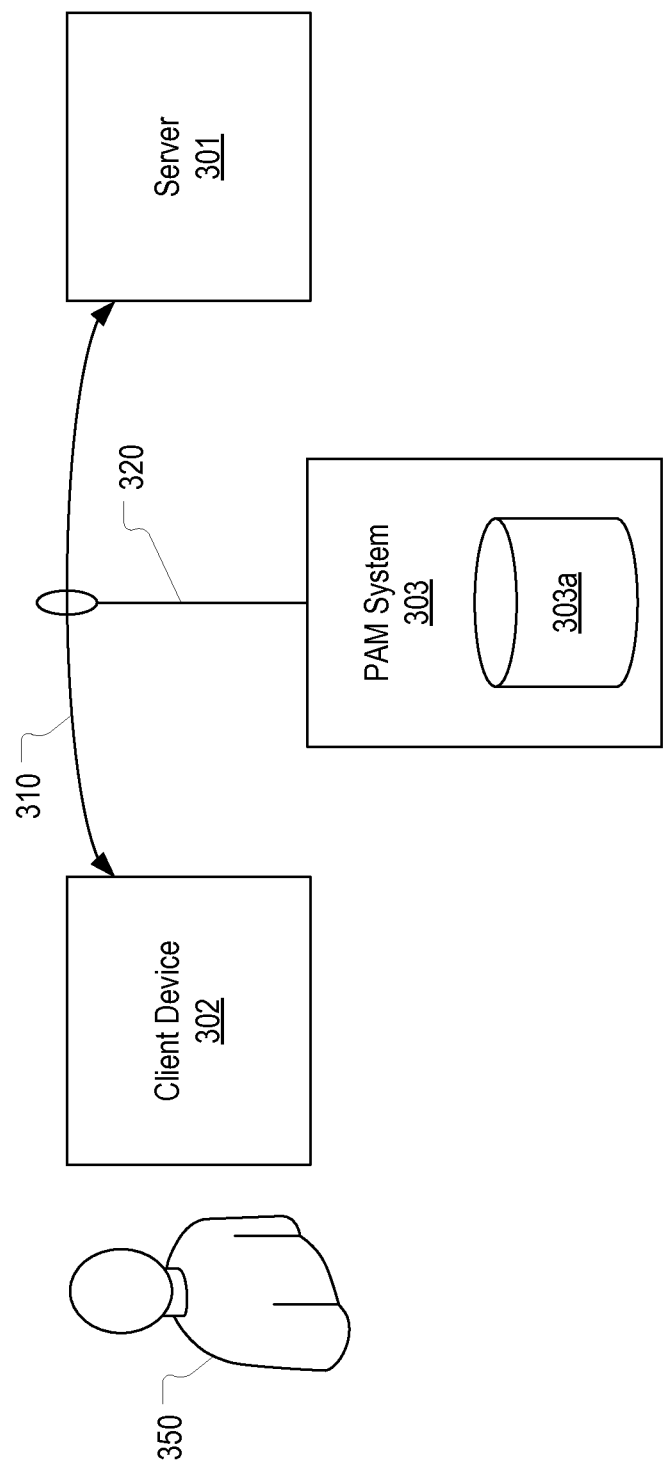
FIG. 3A illustrates an example of how a PAM system can monitor a remote session between a client device and a server using a remote shell protocol analyzer.
Figure 3B:
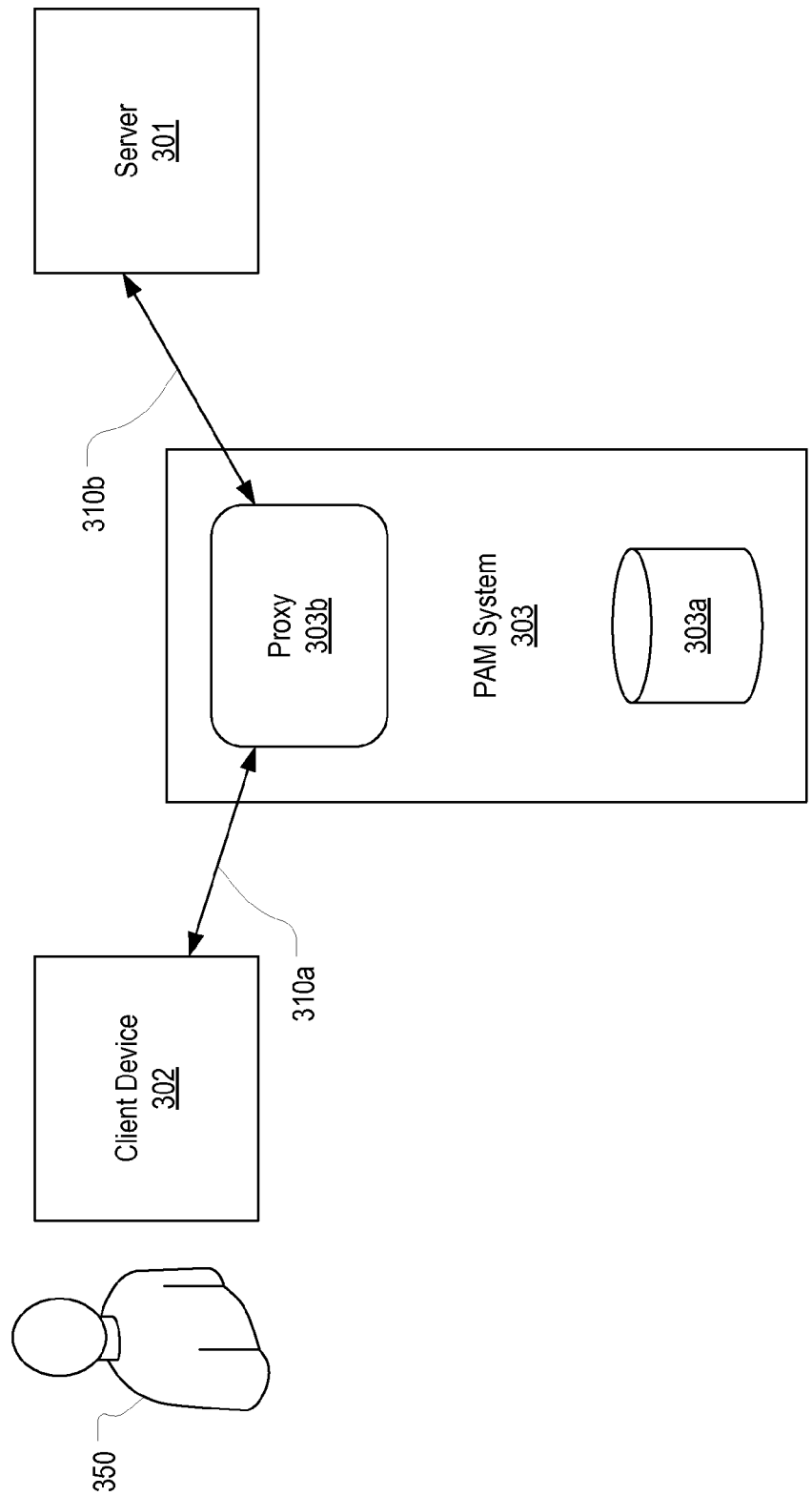
FIG. 3B illustrates an example of how a PAM system can monitor a remote session between a client device and a server using a proxy.
Figure 3C:
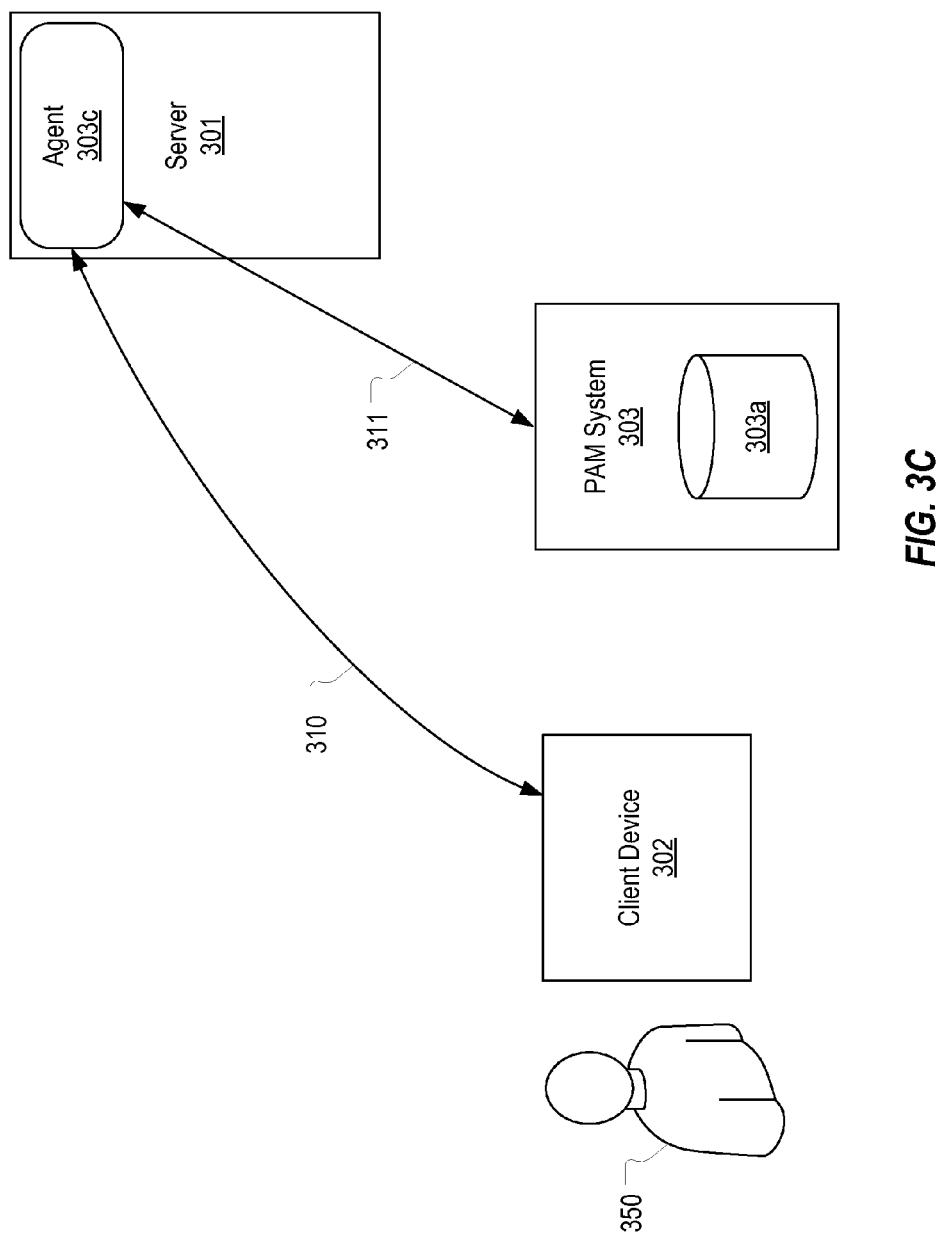
FIG. 3C illustrates an example of how a PAM system can monitor a remote session between a client device and a server using an agent on the server.

Each of FIGS. 3A-3C provides an example of a PAM system 303 that is configured to monitor the amount of data that is transferred over a remote session between a client device 302 and a server 301. The configurations depicted in FIGS. 3A-3C generally correspond with those depicted in FIGS. 2A-2C. However, the present invention should not be construed as being limited to these depicted configurations. In this specification, monitoring the amount of data (or determining how much data is transmitted) should be construed as encompassing either or both determining a total amount of data transferred over a remote session or determining the rate at which data is transmitted over a remote session.

In FIG. 3A, PAM system 303 is not configured to act as an intermediary in a remote session between client device 302 and server 301. Accordingly, in such configurations, PAM system 303 can include, or otherwise be configured to use, a remote shell protocol analyzer 320 that is configured to monitor a remote session 310 to determine how much data is transmitted over remote session 310. As mentioned above, this determination can include determining a total amount of data that is transferred over remote session 310 and/or determining a rate at which data is transferred over remote session 310.

In FIG. 3B, PAM system 303 is configured to implement a proxy 303b by which corresponding remote sessions 310a, 310b are established. Proxy 303b can be configured to monitor one or both of remote sessions 310a, 310b to determine how much data (i.e., total data and/or the data rate) is transmitted over the remote session. Although not shown, a hosted-session-based PAM system configuration could be depicted in a similar manner.

In FIG. 3C, PAM system 303 is configured to provide agent 303c on server 301. Agent 303c can be configured to monitor how much data (i.e., total data and/or the data rate) is transmitted over remote session 310 and report this amount to PAM system 303 via communication link 311.

In each of FIGS. 3B and 3C, because a component of PAM system 303 is involved in establishing remote session 310, PAM system 303 can directly identify how much data is transmitted over remote session 310 (i.e., without requiring a separate remote shell protocol analyzer). However, in any of these configurations, a remote shell protocol analyzer could be used to determine how much data is transmitted over a remote session. For example, in FIG. 3B, PAM system 303 could employ a remote shell protocol analyzer to monitor the amount of data that is transmitted over remote session 310a and/or remote session 310b. Similarly, in FIG. 3B, PAM system 303 could employ a remote shell protocol analyzer to monitor the amount of data that is transmitted over remote session 310.

In each depicted architecture, PAM system 303 includes a database 303a. In this specification, a database should be construed broadly to include any computing construct in which data and associations between such data can be stored and/or defined. PAM system 303 can use database 303a to store an association between a reason code and a normal amount of data that is transferred over a remote session when accomplishing a task associated with the reason code. In other words, database 303a can indicate how much data should typically be transferred between a client device and a server when performing the task identified by a particular reason code.

FIG. 4 illustrates an example data structure 400 that can be stored within database 303a. For ease of illustration, data structure 400 is shown as a table having a column 401 for reason code entries, a column 402 for identifying a corresponding protocol, a column 403 for identifying a corresponding server, a column 404 for identifying a corresponding administrator, and columns 405-408 which define a normal amount of incoming data, a normal amount of outgoing data, a normal rate of incoming data, and a normal rate of outgoing data respectively when the task associated with the reason code is performed by the specified administrator on the specified server using the specified protocol. Accordingly, when data structure 400 is employed, a PAM system, when monitoring a remote session established by a particular administrator to perform a particular task on a particular server using a particular protocol, can know the amount and rate of data that would normally be transmitted.

In FIG. 4, the data appearing in a single row of data structure 400 will be referred to generally as a reason code entry. A reason code entry therefore defines one or more normal amounts or normal rates and the reason code and protocol (and possibly the server and administrator) with which each normal amount or normal rate is associated. As an example, reason code entry 400a defines normal amounts and normal rates for a remote session established by admin A with server A using RDP for the purpose of rebooting the server.

As stated above, when an administrator desires to perform a task on a server that is protected by a PAM system, the PAM system typically requires that the administrator include a reason code in a request for access to the server. Accordingly, once the administrator establishes a remote session with the server, the PAM system will know what task the administrator should be accomplishing over the remote session as well as the protocol used to establish the remote session. The PAM system can then monitor the remote session to identify how much data is transferred over the remote session. Because the PAM system knows which particular reason code the administrator specified to obtain the remote session, the PAM system can access database 303a to compare the amount and/or rate of data that is transferred over the remote session to the normal amount and/or rate that is defined for that particular reason code and protocol. If the PAM system determines that the amount and/or rate of data transferred over the remote session exceeds the normal amount and/or rate by a specified threshold, the PAM system can determine that it is likely that the administrator is performing a task other than the one associated with the specified reason code or that someone other than the administrator is using the remote session. In either case, the PAM system can take action to mitigate any potential harm to the server.

Figure 5:
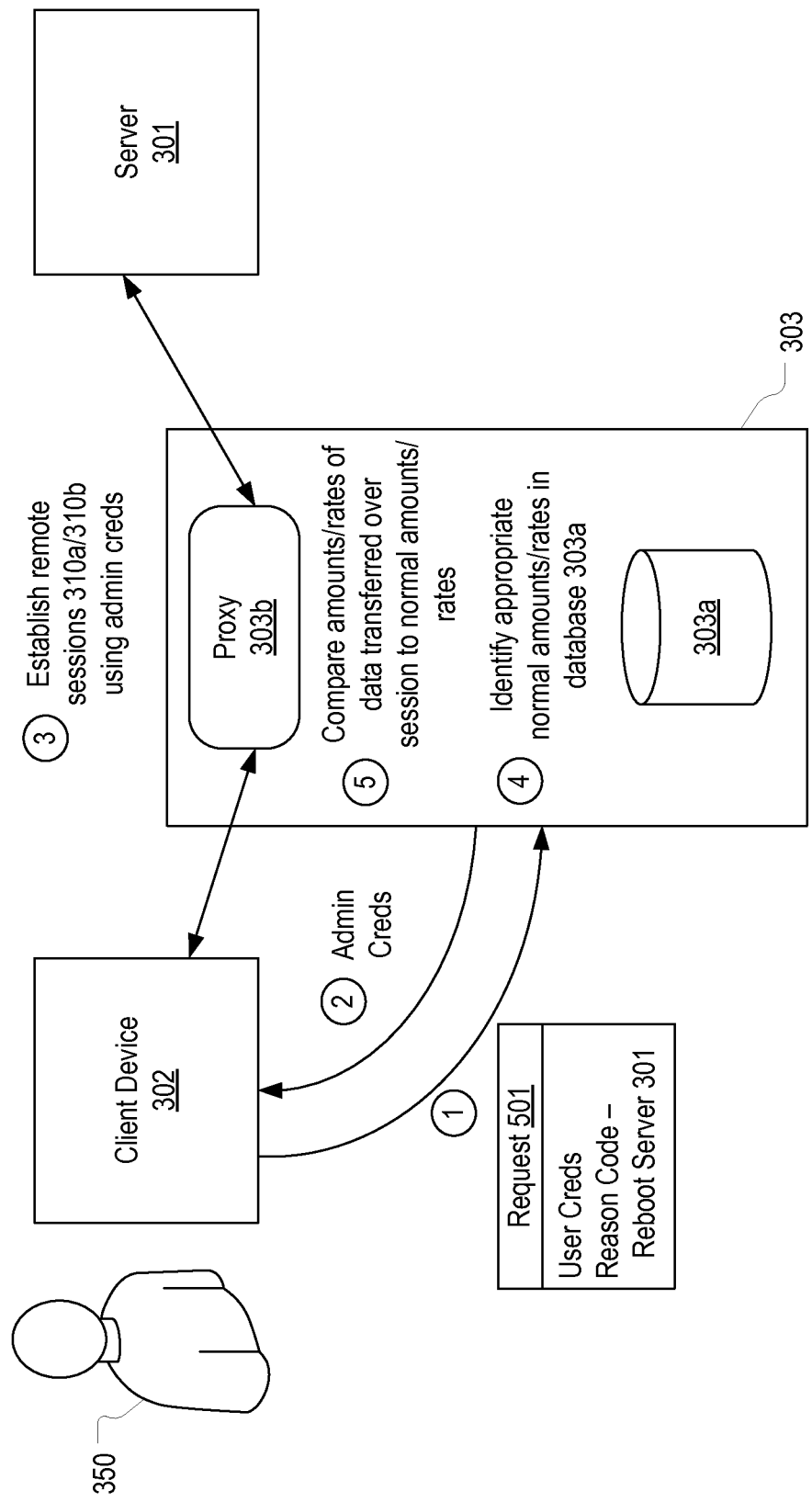
FIG. 5 illustrates an example flow diagram identifying how a PAM system can monitor an amount of data transferred over a remote session based on a reason code associated with the remote session.

FIG. 5 provides an example of this process when implemented in the configuration shown in FIG. 3B. As shown, in step 1, administrator 350 uses client device 302 to submit a request 501 to PAM system 303. Request 501 includes administrator 350's user credentials, a reason code of "Reboot Server," and an identification of server 301. In step 2, it is assumed that request 501 has been approved and therefore the admin credentials for accessing server 301 are sent to client device 302. In step 3, administrator 350 uses the admin credentials to initiate remote session 310a. Because PAM system 303 is configured as a proxy in this example, remote session 310a is established between client device 302 and proxy 303b while a corresponding remote session 310b is established between proxy 303b and server 301 (collectively referred to as remote session 310). In step 4, which may not necessarily be performed after step 3, PAM system 303 accesses database 303a using the reason code of "Reboot Server," the knowledge that administrator 350 has submitted the request and that remote session 310 is with server 301, and the protocol used to establish remote session 310 to thereby obtain the appropriate normal amounts/rates.

In this example, and assuming that server 301 is server A, that administrator 350 is admin A, and that remote session 310 is established using RDP, PAM system 303 could identify from reason code entry 400a in data structure 400 that a normal amount of incoming data is 365 KB, that a normal amount of outgoing data is 3041 KB, that a normal rate of incoming data is 10 KB/s, and that a normal rate of outgoing data is 25 KB/s. In step 5, PAM system 303 monitors the amount of incoming and outgoing data that is transferred over remote session 310 as well as the rates at which such data is transferred. If any of the monitored amounts or rates exceed the corresponding normal amount or normal rate, PAM system 303 can determine that administrator 350 is likely performing a task other than rebooting server 301 or that another user is accessing server 301. In response, PAM system 303 can take an action to mitigate any potential harm to server 301.

In some embodiments, the action that PAM system 303 takes can be based on how much the amount or the rate exceeds the corresponding normal amount or normal rate. For example, using the example normal incoming amount of 365 KB provided in FIG. 4, PAM system 303 may be configured to take a first action (e.g., flagging the session for review) when the amount of incoming data transferred over remote session 310 exceeds 730 KB, a second action (e.g., recording the session) when the amount of incoming data transferred over remote session 310 exceeds 1.5 MB, and a third action (e.g., killing the session) when the amount of incoming data transferred over remote session 310 exceeds 3 MB.

In some embodiments, the threshold used to determine if an action should be taken can be defined within database 303a in association with a particular reason code or reason code entry. In other words, each reason code or reason code entry may be associated with its own threshold or thresholds. For example, a PAM system may employ a threshold of 100% of the normal amount/rate (i.e., the PAM system may take an action whenever the amount of data transferred over the remote session or the rate of transfer doubles the normal amount/rate). In some embodiments, thresholds may be defined that are specific to a particular administrator or group of administrators. For example, if an administrator is inexperienced (and therefore more likely to employ improper or harmful commands inadvertently), a smaller threshold may be defined for that administrator so that action is taken sooner to minimize any harm the administrator's inexperience may cause.

Although the above example describes a scenario where a PAM system employs the normal amounts of incoming and outgoing data and the normal rates of incoming and outgoing data, in some embodiments of the present invention, any one or more of these normal amounts/rates could be employed. For example, in some embodiments, a PAM system may be configured to monitor only the amount of data that is transferred over a remote session in one or both directions. Similarly, in some embodiments, a PAM system may be configured to monitor only the rate of data that is transferred over a remote session in one or both directions.

Also, in some embodiments, normal amounts and/or normal rates may be stored which are not specific to an administrator and a server. For example, a normal amount or rate may be stored that defines a normal amount of data or a normal rate of data transfer when a particular task is performed by any administrator using a particular protocol on a particular server (which, with reference to FIG. 4, could be accomplished by removing column 404 from data structure 400). In such cases, when a remote session is subsequently established to perform the particular task on the particular server, the amount of data and/or rate of data transferred over the remote session could be compared to the same normal amount and/or rate regardless of which administrator is performing the task. Similarly, a normal amount or rate may be stored that defines a normal amount of data or a normal rate of data transfer when a particular task is performed by a particular administrator using a particular protocol on any server (e.g., by removing column 403 from data structure 400). In such cases, when a remote session is subsequently established for the particular administrator to perform the particular task, the amount of data and/or rate of data transferred over the remote session could be compared to the same normal amount and/or rate regardless of which server the remote session is with. Also, a normal amount or rate may be stored that is not particular to a server or an administrator (e.g., by removing both columns 403 and 404 from data structure 400).

In some embodiments, a PAM system may be configured to implement a learning mode by which normal amounts and normal rates are generated. While in this learning mode, the PAM system can monitor remote sessions as described above to identify amounts and rates of data transferred over the remote sessions. The PAM system can then use the identified amounts and rates to create or update normal amounts and rates for the different combinations of reason code, protocol, server, or administrator. For example, the normal amount of incoming data of 95 KB that is defined in data structure 400 for the combination of the reboot server reason code, the SSH protocol, server A, and admin A could have been generated by PAM system 303 after having monitored the amount of incoming data that was generated over a number of remote sessions that admin A established with server A using SSH to reboot the server.

This learning mode can be employed initially until a sufficient number of remote sessions have been monitored to generate reasonable normal amounts/rates for the particular combination of criteria. Even after normal amounts/rates have been established, the learning mode can still be employed to update the normal amounts/rates based on subsequent monitoring of a remote session that matches the corresponding criteria. In other words, the learning mode can be employed at the same time as the PAM system is actively monitoring remote sessions to detect abnormal amounts/rates of data transfer. In such cases, when the amounts/rates of a monitored session are determined to fall within the defined normal amounts/rates, the identified amounts/rates can be used to update the defined normal amounts/rates, whereas if the identified amounts/rates are determined to be abnormal, they can be excluded from the learning mode process. Accordingly, the PAM system can increase the accuracy of its normal amounts/rates over time as it monitors additional remote sessions.

A PAM system can be configured to generate a normal amount or rate using any suitable algorithm. Such algorithms could include a simple algorithm that averages the amounts/rates that were identified during monitored remote sessions. However, more complex algorithms may be preferred such as, for example, to account for anomalies that may occur in particular remote sessions that would not otherwise be considered as abnormal.

Figure 6:
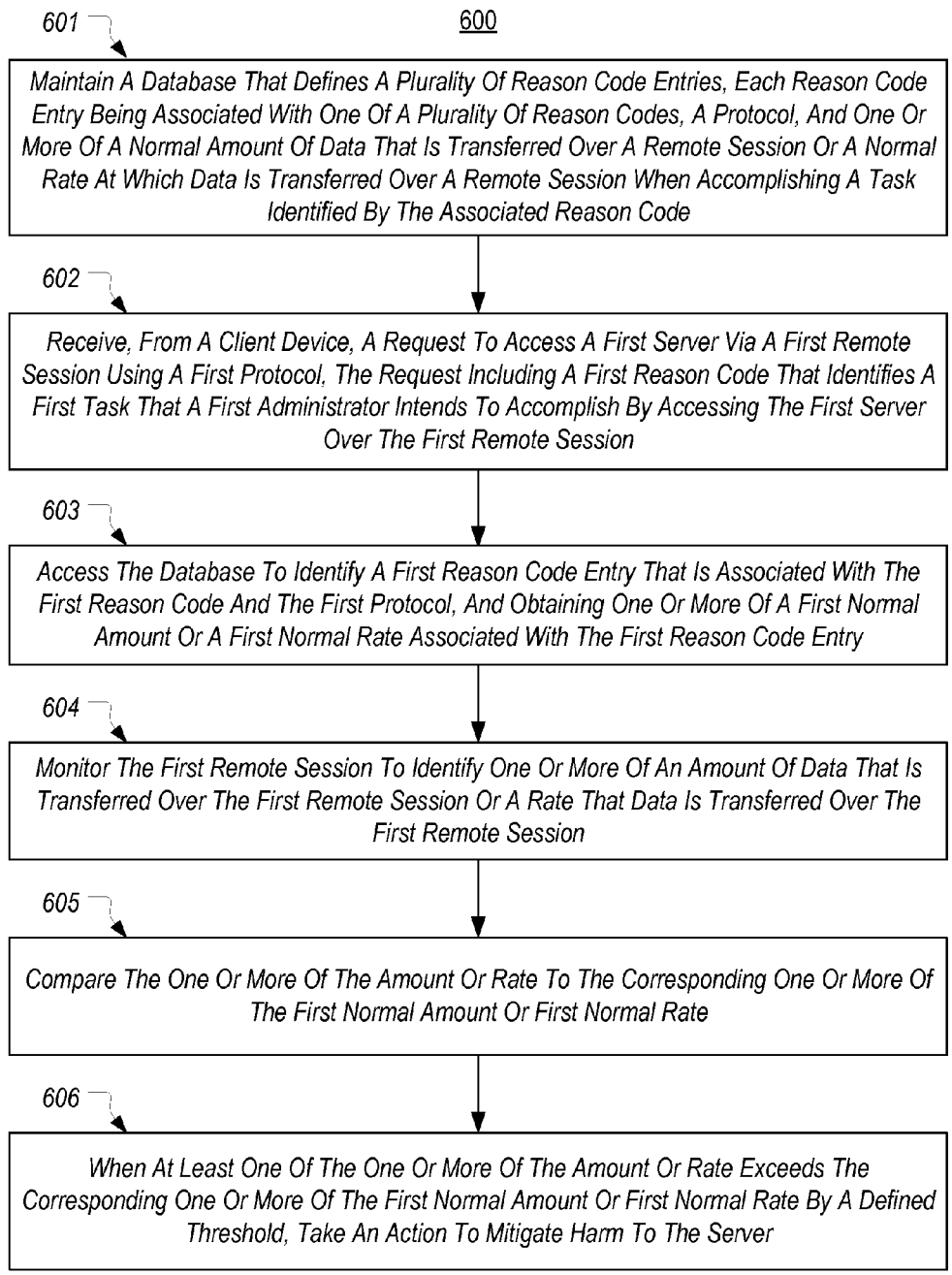
FIG. 6 illustrates a flowchart of an example method for detecting unauthorized, risky, or inefficient usage of admin credentials.

FIG. 6 illustrates a flowchart of an example method 600 for detecting unauthorized, risky, or inefficient usage of admin credentials. Although method 600 will be described primarily with reference to FIG. 5, it is to be understood that method 600 can be implemented by any PAM system capable of monitoring a remote session between a client device and a server. Also, although method 600 will be described as employing data structure 400, method 600 should be construed as being capable of employing any suitable data structure that defines one or both of normal amounts or normal rates of data for reason codes including implementations where the normal amounts and normal rates are not specific to an administrator and/or a server.

Method 600 includes an act 601 of maintaining a database that defines a plurality of reason code entries, each reason code entry being associated with one of a plurality of reason codes, a protocol, and one or more of a normal amount of data that is transferred over a remote session or a normal rate at which data is transferred over a remote session when accomplishing a task identified by the associated reason code. For example, PAM system 303 can maintain a database 303a that includes data structure 400.

Method 600 includes an act 602 of receiving, from a client device, a request to access a first server via a first remote session using a first protocol, the request including a first reason code that identifies a first task that a first administrator intends to accomplish by accessing the first server over the first remote session. For example, PAM system 303 can receive request 501 that provides a reboot server reason code which results in client device 302 establishing remote session 310 using RDP.

Method 600 includes an act 603 of accessing the database to identify a first reason code entry that is associated with the first reason code and the first protocol, and obtaining one or more of a first normal amount or a first normal rate associated with the first reason code entry. For example, PAM system 303 can access database 303a to identify that the reboot reason code has an associated normal amount of incoming data of 365 KB when admin A uses RDP to establish a remote session with server A.

Method 600 includes an act 604 of monitoring the first remote session to identify one or more of an amount of data that is transferred over the first remote session or a rate that data is transferred over the first remote session. For example, PAM system 303 can employ proxy 303b or a remote shell protocol analyzer to analyze the amount of incoming data that is transferred over remote session 310.

Method 600 includes an act 605 of comparing the one or more of the amount or rate to the corresponding one or more of the first normal amount or first normal rate. For example, PAM system 303 can compare the amount of incoming data transferred over remote session 310 to the normal amount of 365 KB.

Method 600 includes an act 606 of taking an action to mitigate harm to the server when at least one of the one or more of the amount or rate exceeds the corresponding one or more of the first normal amount or first normal rate by a defined threshold. For example, PAM system 303 can flag, record, watch, or kill remote session 310 when the incoming data transmitted over remote session 310 exceeds 365 KB by some threshold.

FIG. 7 illustrates a flowchart of an example method 700 for creating a database that defines a plurality of reason code entries, each reason code entry being associated with one of a plurality of reason codes, a protocol, and one or more of a normal amount of data that is transferred over a remote session or a normal rate at which data is transferred over a remote session when accomplishing a task identified by the associated reason code. Any PAM system, including those described above, can be configured to implement method 700. Although method 700 will be described with reference to data structure 400, it is to be understood that method 700 can be used to create/maintain associations between reason codes and normal amounts/rates of data using any suitable data structure.

Method 700 includes an act 701 of monitoring each of a plurality of remote sessions to identify one or more of an amount of data that is transferred over the remote session or a rate that data is transferred over the remote session, each remote session being associated with a reason code that defines a task to be accomplished over the remote session, each remote session being established using a particular protocol. For example, PAM system 303 can monitor a number of remote sessions that are associated with a reboot server reason code and established using RDP to identify how much data is transmitted over the remote sessions when performing the task of rebooting a server.

Method 700 includes an act 702 of generating, from each of a plurality of sets of remote sessions, one or more of a normal amount or a normal rate from the one or more of the identified amounts or rates from the set of remote sessions, wherein each of the remote sessions in the set is associated with the same reason code and was established using the same protocol. For example, PAM system 303 can generate a normal amount of incoming data of 365 KB that is transferred when admin A reboots server A over a remote session established using RDP and a normal amount of incoming data of 405 KB that is transferred when admin A reboots server B over a remote session established using RDP.

Method 700 includes an act 703 of, for each set of remote sessions, storing, in the database, a reason code entry in association with the reason code, the protocol, and the one or more of the normal amount or normal rate for the set such that each reason code entry in the database defines one or more of a normal amount or a normal rate of data that is transferred when performing the task associated with the reason code over a remote session established using the associated protocol. For example, PAM system 303 can store reason code entry 400a in data structure 400.

In summary, the present invention provides a way to identify a normal amount or rate of data that should be required to accomplish a specified task on a server over a remote session. By knowing a normal amount or rate, a PAM system can identify when a remote session is likely being used to perform an unauthorized task or by an unauthorized individual and take appropriate action. Also, by knowing a normal amount or rate, a PAM system can identify when an administrator may be performing a task inefficiently or incorrectly and take appropriate action to ensure that the administrator is trained properly.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by a privileged account management system, for detecting unauthorized, risky, or inefficient usage of admin credentials, the method comprising:
    maintaining a database that defines a plurality of reason code entries, each reason code entry being associated with one of a plurality of reason codes, a protocol, and one or more of a normal amount of data that is transferred over a remote session or a normal rate at which data is transferred over a remote session when accomplishing a task identified by the associated reason code;
    receiving, from a client device, a request to access a first server via a first remote session using a first protocol, the request including a first reason code that identifies a first task that a first administrator intends to accomplish while logged in to the first server via the first remote session;
    accessing the database to identify a first reason code entry that is associated with the first reason code and the first protocol, and obtaining one or more of a first normal amount or a first normal rate associated with the first reason code entry;
    monitoring the first remote session to identify one or more of an amount of data that is transferred over the first remote session or a rate that data is transferred over the first remote session;
    comparing the one or more of the amount or rate to the corresponding one or more of the first normal amount or first normal rate; and
    when at least one of the one or more of the amount or rate exceeds the corresponding one or more of the first normal amount or first normal rate by a defined threshold, taking an action to mitigate harm to the server.

2. The method of claim 1, wherein at least one of the reason code entries is associated with a normal amount that comprises both:
    a normal amount of incoming data transferred from a client device to a server when accomplishing the associated task; and
    a normal amount of outgoing data transferred from a server to a client device when accomplishing the associated task.

3. The method of claim 2, wherein monitoring the first remote session includes identifying an amount of incoming data that is transferred from the client device to the first server and an amount of outgoing data that is transferred from the first server to the client device; and
    wherein comparing the one or more of the amount or rate includes comparing the amount of incoming data and the amount of outgoing data to a first normal amount of incoming data and a first normal amount of outgoing data respectively associated with the first reason code entry.

4. The method of claim 1, wherein at least one of the reason code entries is associated with a normal amount that comprises both:
    a normal rate of incoming data that is transferred from a client device to a server when accomplishing the associated task; and
    a normal rate of outgoing data transferred from a server to a client device when accomplishing the associated task.

5. The method of claim 4, wherein monitoring the first remote session includes identifying a rate of incoming data that is transferred from the client device to the first server and a rate of outgoing data that is transferred from the first server to the client device; and
    wherein comparing the one or more of the amount or rate includes comparing the rate of incoming data and the rate of outgoing data to a first normal rate of incoming data and a first normal rate of outgoing data respectively associated with the first reason code entry.

6. The method of claim 1, wherein at least one of the reason code entries is also associated with one or both of a particular server or a particular administrator.

7. The method of claim 1, wherein at least one of the reason code entries is also associated with a particular server and a particular administrator.

8. The method of claim 1, wherein at least one of the reason code entries is also associated with one or both of a particular server or a particular group of administrators.

9. The method of claim 1, wherein at least one of the reason code entries is associated with each of a normal amount of incoming data, a normal amount of outgoing data, a normal rate of incoming data, and a normal rate of outgoing data.

10. The method of claim 9, wherein the at least one of the reason code entries is also associated with a particular server and a particular administrator.

11. The method of claim 1, wherein the action comprises one or more of:
    flagging the first remote session for review by a security officer;
    recording communications that are transmitted over the first remote session;
    capturing one or more screenshots of the client device; or
    terminating the first remote session.

12. The method of claim 1, wherein maintaining the database comprises:
    for each reason code entry, monitoring a number of remote sessions that are established using the associated protocol to accomplish the task identified by the associated reason code to identify one or more of an amount of data transferred over each remote session or a rate at which the data is transferred over each remote session, and generating the one or more of the associated normal amount or normal rate from the identified amounts or identified rates.

13. The method of claim 12, wherein generating the one or more of the associated normal amount or normal rate from the identified amounts or identified rates comprises generating a normal amount of incoming data, a normal amount of outgoing data, a normal rate of incoming data, and a normal rate of outgoing data from the identified amounts and identified rates.

14. A method, implemented by a privileged account management system, for creating a database that defines a plurality of reason code entries, each reason code entry being associated with one of a plurality of reason codes, a protocol, and one or more of a normal amount of data that is transferred over a remote session or a normal rate at which data is transferred over a remote session when accomplishing a task identified by the associated reason code, the method comprising:
  monitoring each of a plurality of remote sessions to identify one or more of an amount of data that is transferred over the remote session or a rate that data is transferred over the remote session, each remote session being associated with a reason code that defines a task to be accomplished over the remote session, each remote session being established using a particular protocol;
  from each of a plurality of sets of remote sessions, generating one or more of a normal amount or a normal rate from the one or more of the identified amounts or rates from the set of remote sessions, wherein each of the remote sessions in the set is associated with the same reason code and was established using the same protocol;
  for each set of remote sessions, storing, in the database, a reason code entry in association with the reason code, the protocol, and the one or more of the normal amount or normal rate for the set such that each reason code entry in the database defines one or more of a normal amount or a normal rate of data that is transferred when performing the task associated with the reason code over a remote session established using the associated protocol.

15. The method of claim 14, wherein monitoring each of a plurality of remote sessions includes identifying a server with which the remote session is established, wherein for each of the plurality of sets of remote sessions, each remote session in the set is established with the same server, and wherein each reason code entry is also associated with the server for the corresponding set.

16. The method of claim 15, wherein monitoring each of a plurality of remote sessions includes identifying an administrator associated with the remote session, wherein for each of the plurality of sets of remote sessions, each remote session in the set is associated with the same administrator, and wherein each reason code entry is also associated with the administrator for the corresponding set.

17. The method of claim 14, wherein the one or more of a normal amount or a normal rate includes a normal amount of incoming data, a normal amount of outgoing data, a normal rate of incoming data, and a normal rate of outgoing data.

18. A privileged account management system comprising:
  one or more processors; and
  one or more computer storage media storing computer executable instructions which when executed by the one or more processors implement a method for detecting unauthorized, risky, or inefficient usage of admin credentials, the method comprising:
    maintaining a database that defines a plurality of reason code entries, each reason code entry being associated with:
      a reason code identifying a task to be performed over a remote session;
      a protocol used to establish the remote session;
      a server with which the remote session is established;
      an administrator associated with the remote session; and
      one or more of a normal amount of incoming data, a normal amount of outgoing data, a normal rate of incoming data, or a normal rate of outgoing data, each normal amount or normal rate representing a normal amount or rate of data that is transferred over a remote session associated with the administrator when the remote session is established with the server using the protocol to perform the task identified by the reason code; and
    monitoring a first remote session to identify one or more of an amount of incoming data, an amount of outgoing data, a rate of incoming data, or a rate of outgoing data transferred over the first remote session, the first remote session being established by a first administrator with a first server using a first protocol and being associated with a first reason code;
    accessing the database to identify a first reason code entry that is associated with the first reason code, the first administrator, the first server, and the first protocol;
    determining whether the one or more of the amount of incoming data, the amount of outgoing data, the rate of incoming data, or the rate of outgoing data transferred over the first remote session exceeds at least one of a first normal amount of incoming data, a first normal amount of outgoing data, a first normal rate of incoming data, or a first normal rate of outgoing data that is associated with the first reason code entry, and if so, taking an action.

19. The privileged account management system of claim 18, wherein the first reason code entry is associated with a first normal amount of incoming data, a first normal amount of outgoing data, a first normal rate of incoming data, and a first normal rate of outgoing data.

20. The privileged account management system of claim 18, wherein the action comprises one or more of:
  flagging the first remote session for review by a security officer;
  recording communications that are transmitted over the first remote session;
  capturing one or more screenshots of a client device used to establish the first remote session; or
  terminating the first remote session.

* * * * *